July 27, 1965
A. J. PIEL
3,196,836
LIVESTOCK MEDICINAL APPLICATOR MEANS
Filed Aug. 29, 1963
2 Sheets-Sheet 1
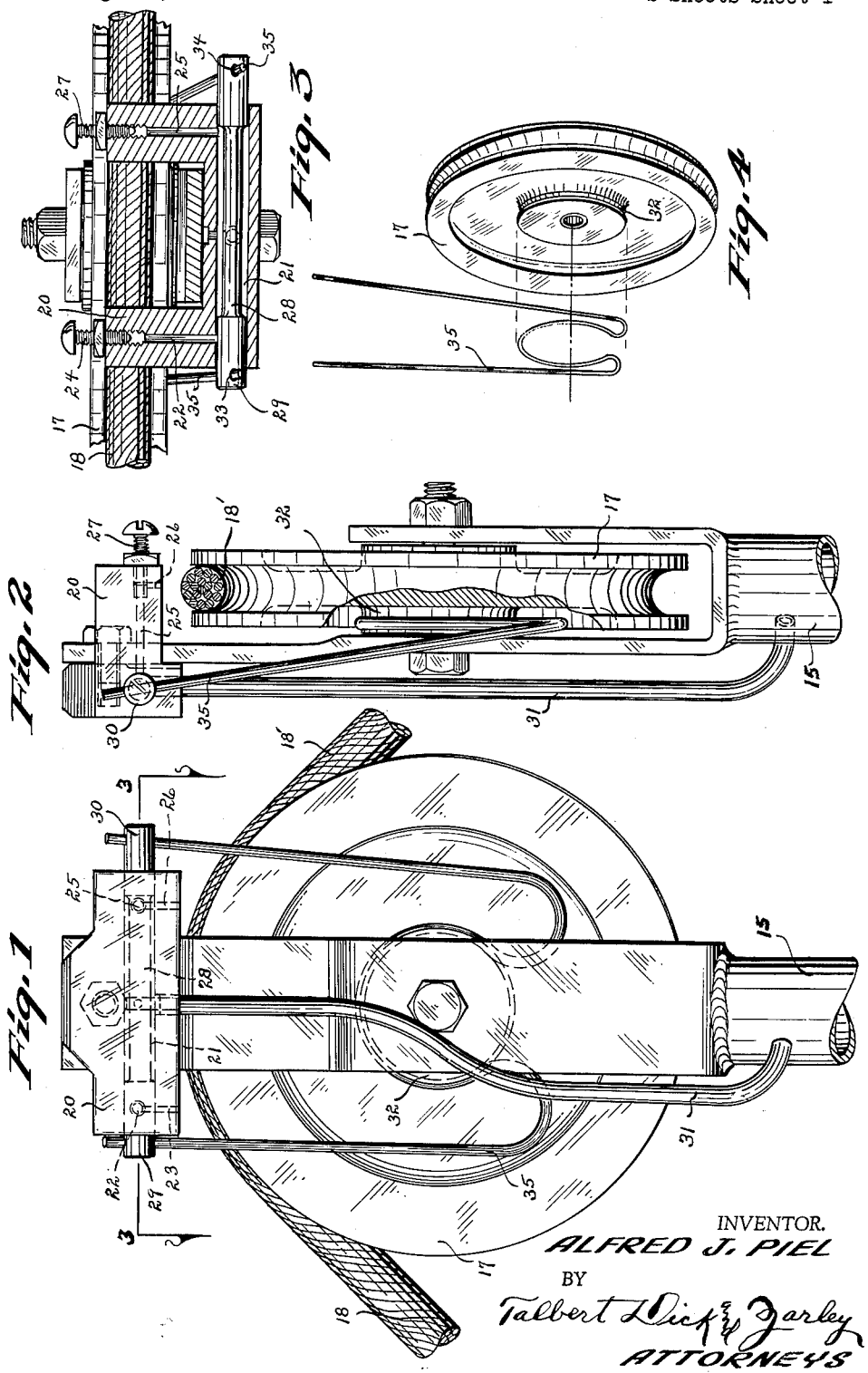
INVENTOR.
ALFRED J. PIEL
BY
Talbert, Dicky Darley
ATTORNEYS

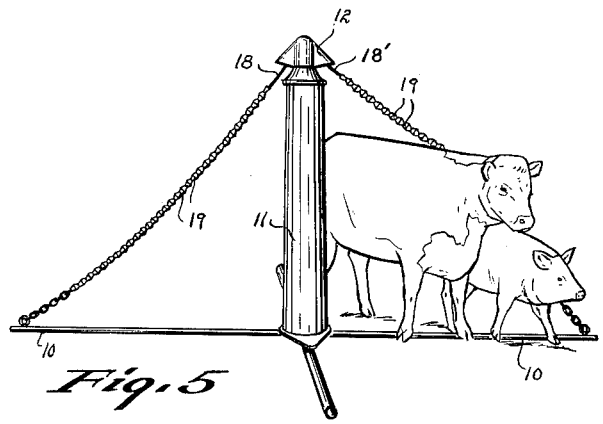
Fig. 5
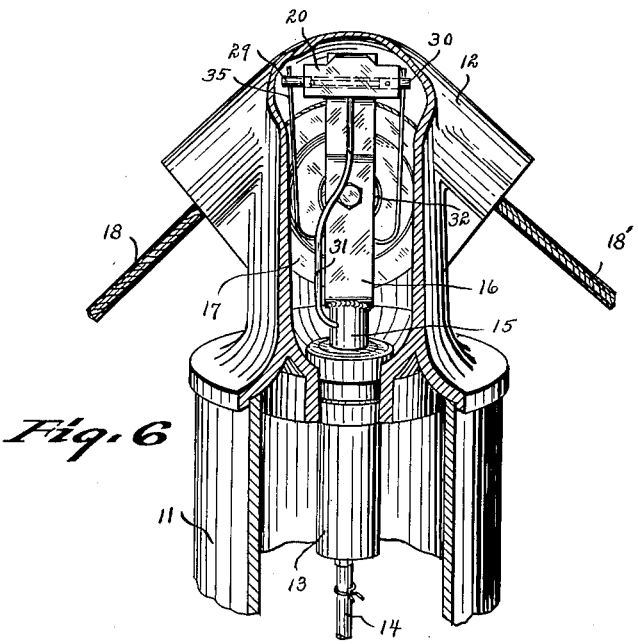
Fig. 6
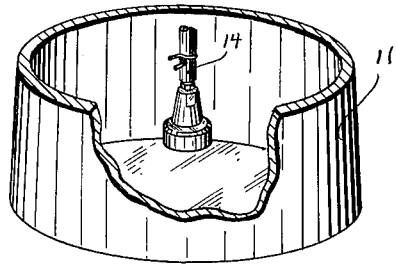
INVENTOR.
ALFRED J. PIEL
BY
Talbert Dick & Harley
ATTORNEYS United States Patent Office 3,196,836
Patented July 27, 1965

3,196,836
LIVESTOCK MEDICINAL APPLICATOR MEANS
Alfred J. Piel, Hubbard, Iowa
Filed Aug. 29, 1963, Ser. No. 305,399
9 Claims. (Cl. 119—157)

This invention relates to livestock medicinal applicator means and in the art is generally referred to as "cow oilers."

Such devices usually have a member upon which the animals scratch or rub themselves, and this member is coated or saturated with the oil, insecticide, or medication required for the skin and hair of the animal. The most popular animal skin applicator consists of a frame, a tank of the liquid to be dispensed, two or more downwardly and outwardly extending rubbing cable lengths, connected to a pump, and a conduit from the pump exiting above the rubbing cable. When the animal engaged a cable length, the cable would be moved and this would actuate the pump and deliver a quantity of liquid onto the cable. Thus the animal itself actuated the device. The objection to such equipment was however its tendency to waste valuable liquid. When one cable length was being used by an animal, not only was that cable length furnished liquid, but the other cable length or cable lengths were furnished liquid. This waste of unused liquid is especially true, when one cable length extends into one animal lot and another cable length extends into another animal lot. Under such circumstances, one animal lot may not have any animals, but if it does such animals may not be using the device at the same time the animals in the other lot are using the device.

Therefore one of the principal objects of my invention is to provide an animal liquid applicator having a plurality of rubbing cable lengths that will furnish liquid only to the specific cable length being used by the animal.

A further object of this invention is to provide an animal liquid applicator that may be easily, independently, quickly, adjusted as to the amount of liquid dispensed to any given cable length.

Still further objects of my invention are to provide an animal liquid applicator that is economical in manufacture, and durable in use.

These and other objects will be apparent to those skilled in the art.

This invention consists in the construction, arrangements, and combination, of the various parts of the device, whereby the objects contemplated are attained as hereinafter more fully set forth, specifically pointed out in the claims, and illustrated in the accompanying drawings, in which:

FIG. 1 is an enlarged side view of the upper portion of the mechanism of my animal liquid applicator;

FIG. 2 is an enlarged vertical sectional view of the upper portion of the mechanism of the applicator;

FIG. 3 is an enlarged horizontal sectional view of the applicator means taken on line 3—3 of FIG. 1;

FIG. 4 is an exploded enlarged view of the clutch means used in the device;

FIG. 5 is a perspective view of my animal liquid applicator device in use; and

FIG. 6 is an enlarged perspective view of the central area of the applicator means with sections cut away to more fully illustrate its construction.

In these drawings I have used the numeral 10 to generally designate the ground frame usually consisting of horizontally radially extending pipes, beams or like. Rising from the central area of this ground frame is the vertical tank 11, adapted to hold the liquid desired to be dispensed. A weather cap hood 12 is secured on the open top of the tank 11. Any suitable pump may be used. In the drawings I use a vertical reciprocating pump, the numeral 13 to designate the pump cylinder fixed to the cap hood 12 and communicating with the inside bottom area of the tank 11 via the pipe 14. Vertically reciprocating in the cylinder 13 is the pump shaft 15 having its upper portion hollow as shown in FIG. 1. This shaft 15 is yieldingly held in an upward position of its reciprocation by any suitable means such as a coil spring (not shown) within the cylinder 13. The numeral 16 designates an upwardly extending fork bearing on the top of the pump piston 15. Rotatably mounted in this fork bearing is the pulley wheel 17. In the drawings I show two cable lengths 18 and 18'. These two cable lengths are formed by one cable having one end connected to the outer area of the frame, its length extending over the pulley wheel 17, and its other end connected to the outer area of the frame 10 at a point diametrically opposite from its first connected end. Thus far the applicator described is standard. Rubbing burrs 19 may embrace the two cable lengths. The pump means deposits the liquid onto the cable lengths when the piston shaft is moved downwardly by an animal leaning or rubbing on a cable lengths, as shown in FIG. 3.

This present invention is associated with the heretofore described equipment and which will now be described in detail. Mounted on the top of the fork bearing 16 is a base block 20. This block 20 has a bore 21 extending horizontally through it, and parallel to the cable lengths and pulley wheel, as shown in FIG. 3. The numeral 22 designates a passageway in the block 20 having one end communicating with the inside left area of the bore 21, and its other end portion threaded. The numeral 23 designates a vertical passageway in the block 20 having its upper end communicating with the threaded area of the passageway 22 and its bottom end exiting over the cable length 18. Threaded into the threaded area of the passageway 22 is a needle valve 24 for adjustably regulating the volume of liquid passing downwardly through the passageway 23. The numeral 25 designates a passageway in the block 20 having one end communicating with the inside right area of the bore 21 and its other end portion threaded. The numeral 26 designates a vertical passageway in the block 20, having its upper end communicating with the threaded area of the passageway 25 and its bottom end exciting over the cable length 19. Threaded into the threaded area of the passageway 25 is a needle valve 27 for adjustably regulating the volume of liquid passing downwardly through the passageway 26. Reciprocating in the bore 21 is a piston shaft 28 having a left head 29 and a right head 30. These valve piston heads have their outer ends extending beyond the ends respectively of the bore 21. The distance between the two piston heads is slightly less than that of the distance between the two points where the passageways 22 and 25 communicate with the bore 21. Inasmuch as the diameters of the two piston heads are each greater than that of the diameter of the shaft 28 a space area will be present in the bore 21 between the piston head 29 and piston head 30. The numeral 31 designates a conduit having one end communicating with the inside of the shaft 15 and its other end communicating with the inside of the bore 21 at a point between the two piston heads 29 and 30. By this arrangement of parts, when the piston shaft 28 is in a left sliding position in the bore 21, the piston head 30 will be closing the passageway 25, but liquid from the pump means may pass through the conduit 31, into the bore 21, thence into and through the passageways 22 and 23 and onto the upper end portion of the cable length 18. When the piston shaft 28 is in a right sliding position in the bore 21, the piston head 29 will be closing the passageway 22, but liquid from the pump means may pass through the conduit 31, into the bore 21, thence into and through the passageways 25 and 26 and onto the upper end portion of the cable length 18'. Obviously, when the cable length 18 is moved by an animal, the top of the pulley wheel 17 will be rotated to the left and the pulley wheel and the fork 16 will be pulled downwardly by this movement of the cable to actuate the pump means. It is at this time that the liquid should be deposited on the cable length 18. When the cable length 18' is moved by an animal, the top of the pulley wheel 17 will be rotated to the right and the pulley wheel and the fork 16 will be pulled downwardly by this movement of the cable to actuate the pump means. It is at this time that the liquid should be deposited on the cable length 18'. I accomplish these desired results by a clutch means. On the hub portion of the pulley wheel 17, I have a peripheral grooved wheel portion 32. The numeral 33 designates a hole extending transversely through the outer end portion of the piston head 29 and the numeral 34 designates a like hole extending transversely through the outer end portion of the piston head 30. The numeral 35 designates a spring rod having its center portion bent around and frictionally engaging the major circumference of the peripheral groove of the wheel 32. The left end length of the rod 35 slidably extends through the hole 33, and the right end length of the rod slidably extends through the hole 34. Therefore when the cable 18 is moved by an animal the top of the pulley wheel 17 will be rotated to the left, and then rod 35 will by frictional contact with the wheel 32, move the piston 28 assembly to the left and permit liquid to pass to the cable length 18. When the cable 18' is moved the pulley wheel will be rotated in the opposite direction and the rod 35 will move the piston 28 assembly to the right and permit liquid to pass to the cable length 18'.

From the forgoing it will be seen that I have provided an automatic means for furnishing liquid only to the cable being used and that the volume of liquid to that cable is individually adjustable.

Some changes may be made in the construction and arrangement of my livestock medicinal applicator means without departing from the real spirit and purpose of my invention, and it is my intention to cover by my claims, any modified forms of structure or use of mechanical equivalents which may be reasonably included within their scope.

I claim:

1. In an animal liquid applicator,
a tank container adapted to hold the liquid to be dispensed,
a vertically movable member,
a pump means actuated by said vertically movable member and communicating with the inside of said tank container,
a wheel rotatably mounted on said vertically movable member,
an elongated flexible member having its center area extending over and engaging said wheel,
means for securing one end of said flexible member against movement to provide a first length flexible member at one side of said wheel,
a means for securing the other end of said flexible member against movement to provide a second length flexible member at the other side of said wheel;
said first and second lengths extending downwardly and outwardly away from each other,
and a valve means mounted on said vertically movable member operatively connected to said wheel in communication with said pump means adapted to deposit liquid only on said first length flexible member when said wheel is rotated in one direction and adapted to deposit liquid only on said second length flexible member when said wheel is rotated in the other direction.

2. In an animal liquid applicator,
a tank container adapted to hold the liquid to be dispensed,
a vertically movable member,
a pump means actuated by said vertically movable member and communicating with the inside of said tank container,
a pulley wheel rotatably mounted on said vertically movable member,
an elongated flexible member having its center area extending over and engaging said pulley wheel,
means for securing one end of said flexible member against movement to provide a first length flexible member at one side of said pulley wheel,
a means for securing the other end of said flexible member against movement to provide a second length flexible member at the other side of said pulley wheel;
said first and second length extending downwardly and outwardly away from each other,
and a valve means mounted on said vertically movable member operatively connected to said pulley wheel in communication with said pump means adapted to deposit liquid only on said first length flexible member when said pulley wheel is rotated in one direction and adapted to deposit liquid only on said second length flexible member when said pulley wheel is rotated in the other direction.

3. In an animal liquid applicator,
a tank container adapted to hold the liquid to be dispensed,
a vertically movable member,
a pump means communicating with the inside of said tank container,
a pulley wheel rotatably mounted on said vertically movable member,
an elongated flexible member having its center area extending over and engaging said pulley wheel,
means for securing one end of said flexible member against movement to provide a first length flexible member at one side of said pulley wheel,
a means for securing the other end of said flexible member against movement to provide a second length flexible member at the other side of said pulley wheel;
said first and second lengths extending downwardly and outwardly away from each other,
and a valve means mounted on said vertically movable member operatively connected to said pulley wheel in communication with said pump means adapted to deposit liquid only on said first length flexible member when said pulley wheel is rotated in one direction and adapted to deposit liquid only on said second length flexible member when said pulley wheel is rotated in the other direction.

4. In an animal liquid applicator,
a tank container adapted to hold the liquid to be dispensed,
a vertically movable member,
a pump means communicating with the inside of said tank container,
a pulley wheel rotatably mounted on said vertically movable member,
an elongated flexible member having its center area extending over and engaging said pulley wheel,
means for securing one end of said flexible member against movement to provide a first length member at one side of said pulley wheel,
a means for securing the other end of said flexible member against movement to provide a second length flexible member at the other side of said pulley wheel;
said first and second lengths extending downwardly and outwardly away from each other, and an adjustable valve means mounted on said vertically movable member operatively connected to said pulley wheel in communication with said pump means adapted to deposit liquid only on said first length flexible member when said pulley wheel is rotated in one direction and adapted to deposit liquid only on said second length flexible member when said pulley wheel is rotated in the other direction.

5. In a animal liquid applicator, comprising in combination,
   a tank container adapted to hold the liquid to be dispensed,
   a vertically movable member,
   a pump means actuated by said vertically movable member and communicating with the inside of said tank container,
   a pulley wheel rotatably mounted on said vertically movable member,
   an elongated flexible member having its center area extending over and engaging said pulley wheel,
   means for securing one end of said flexible member against movement to provide a first length flexible member at one side of said pulley wheel,
   a means for securing the other end of said flexible member against movement to provide a second length flexible member at the other side of said pulley wheel;
   said first and second lengths extending downwardly and outwardly away from each other,
   a block member mounted on said vertically movable member and having a bore formed therein,
   said block member having a first passageway formed therein which has one end in operative communication with said first length flexible member and its other end communicating with the inside of said bore,
   said block member having a second passageway formed therein which has one end in operative communication with said second length flexible member and its other end communicating with the inside of said bore,
   means for fluidly connecting said pump means and said bore in said block member,
   a shaft reciprocatively mounted in said bore,
   a first valve piston head on said shaft capable of closind and opening said first passageway when said shaft is operatively reciprocated,
   a second valve piston head on said shaft capable of closing said second passageway when said first valve piston head has opened said first passageway and capable of opening said second passageway when said first valve piston head has closed said first passageway,
   and means for operatively reciprocating said shaft.

6. In an animal liquid applicator, comprising in combination,
   a tank container adapted to hold the liquid to be dispensed,
   a vertically movable member,
   a pump means actuated by said vertically movable member and communicating with the inside of said tank container,
   a pulley wheel rotatably mounted on said vertically movable member,
   an elongated flexible member having its center area extending over and engaging said pulley wheel,
   means for securing one end of said flexible member against movement to provide a first length flexible member at one side of said pulley wheel,
   a means for securing the other end of said flexible member against movement to provide a second length flexible member at the other side of said pulley wheel;
   said first and second lengths extending downwardly and outwardly away from each other,
   a block member mounted on said vertically movable member and having a bore formed therein,
   said block member having a first passageway formed therein which has one end in operative communication with said first length flexible member and its other end communicating with the inside of said bore,
   said block member having a second passageway formed therein which has one end in operative communication with said second length flexible member and its other end communicating with the inside of said bore,
   means for fluidly connecting pump means and said bore in said block member,
   a shaft reciprocatively mounted in said bore,
   a first valve piston head on said shaft capable of closing and opening said first passageway when said shaft is operatively reciprocated,
   a second valve piston head on said shaft capable of closing said second passageway when said valve piston head has opened said first passageway and capable of opening said second passageway when said first valve piston head has closed said first passageway,
   means for operatively reciprocating said shaft,
   and a means operatively connected to said pulley wheel for operatively reciprocating said shaft.

7. In an animal liquid applicatior, comprising in combination,
   a tank container adapted to hold the liquid to be dispensed,
   a vertically movable member,
   a pump means actuated by said vertically movable member and communicating with the inside of said tank container,
   a pulley wheel rotatably mounted on said vertically movable member,
   an elongated flexible member having its center area extending over and engaging said pulley wheel,
   means for securing one end of said flexible member against movement to provide a first length flexible member at one side of said pulley wheel,
   a means for securing the other end of said flexible member against movement to provide a second length flexible member at the other side of said pulley wheel;
   said first and second lengths extending downwardly and outwardly away from each other,
   a block member mounted on said vertically movable member and having a bore formed therein,
   said block member having a first passageway formed therein which has one end in operative communication with said first length flexible member and its other end communicating with the inside of said bore,
   said block member having a second passageway formed therein which has one end in operative communication with said second length flexible member and its other end communicating with the inside of said bore,
   means for fluidly connecting said pump means and said bore in said block member,
   a shaft reciprocatively mounted in said bore,
   a first valve piston head on said shaft capable of closing and opening said first passageway when said shaft is operatively reciprocated,
   a second valve piston head on said shaft capable of closing said second passageway when said first valve piston head has opened said first passageway and capable of opening said second passageway when said first valve piston head has closed said first passageway,
   means for operatively reciprocating said shaft,
   and a clutch means operatively connected to said pulley wheel for operatively reciprocating said shaft.

8. In an animal liquid applicator, comprising in combination, a tank container adapted to hold the liquid to be dispensed,
a vertically movable member,
a pump means actuated by said vertically movable member and communicating with the inside of said tank container,
a pulley wheel rotatably mounted on said vertically movable member,
an elongated flexible member having its center area extending over and engaging said pulley wheel,
means for securing one end of said flexible member against movement to provide a first length flexible member at one side of said pulley wheel,
a means for securing the other end of said flexible member aginst movement to provide a second length flexible member at the other side of said pulley wheel;
said first and second lengths extending downwardly and outwardly away from each other,
a block member mounted on said vertically movable member and having a bore formed therein,
said block member having a first passageway formed therein which has one end in operative communication with said first length flexible member and its other end communicating with the inside of said bore,
said block member having a second passageway formed therein which has one end in operative communication with said second length flexible member and its other end communicating with the inside of said bore,
means for fluidly connecting said pump means and said bore in said block member,
a shaft reciprocatively mounted in said bore,
a first valve piston head on said shaft capable of closing and opening said first passageway when said shaft is operatively reciprocated,
a second valve piston head on said shaft capable of closing said second passageway when said first valve piston head has opened said first passageway and capable of opening said second passageway when said first valve piston head has closed said first passageway,
means for operatively reciprocating said shaft,
and a means operatively connected to said pulley wheel for operatively reciprocating said shaft, said means being a peripheral grooved hub portion on said pulley wheel, and a spring rod bent around the major part of said peripheral groove with one free end connected to said first piston head and its other free end connected to said second piston head.

9. In an animal liquid applicator, comprising in combination, a tank container adapted to hold the liquid to be dispensed,
a vertically movable member,
a pump means actuated by said vertically movable member and communicating with the inside of said tank container,
a pulley wheel rotatably mounted on said vertically movable member,
an elongated flexible member having its center area extending over and engaging said pulley wheel,
means for securing one end of said flexible member against movement to provide a first length flexible member at one side of said pulley wheel,
a means for securing the other end of said flexible member against movement to provide a second length flexible member at the other side of said pulley wheel;
said first and second lengths extending downwardly and outwardly away from each other,
a block member mounted on said vertically movable member and having a bore formed therein,
said block member having a first passageway formed therein which has one end in operative communication with said first length flexible member and its other end communicating with the inside of said bore,
said block member having a second passageway formed therein which has one end in operative communication with said second length flexible member and its other end communicating with the inside of said bore,
means for fluidly connecting said pump means and said bore in said block member,
a shaft reciprocatively mounted in said bore,
a first valve piston head on said shaft capable of closing and opening said first passageway when said shaft is operatively reciprocated,
a second valve piston head on said shaft capable of closing said second passageway when said first valve piston head has opened said first passageway and capable of opening said second passageway when said first valve piston head has closed said first passageway,
means for operatively reciprocating said shaft,
and an adjustable valve on said first passageway and an adjustable valve in said second passageway.

References Cited by the Examiner

UNITED STATES PATENTS 2,813,510  11/57  Piel _____ 119—157

SAMUEL KOREN, *Primary Examiner.*

HUGH R. CHAMBLEE, *Examiner.*